Feb. 6, 1923.
A. C. MASON
1,444,352
CONNECTING ROD AND WRIST PIN CONNECTING DEVICE
Filed Feb. 21, 1919.
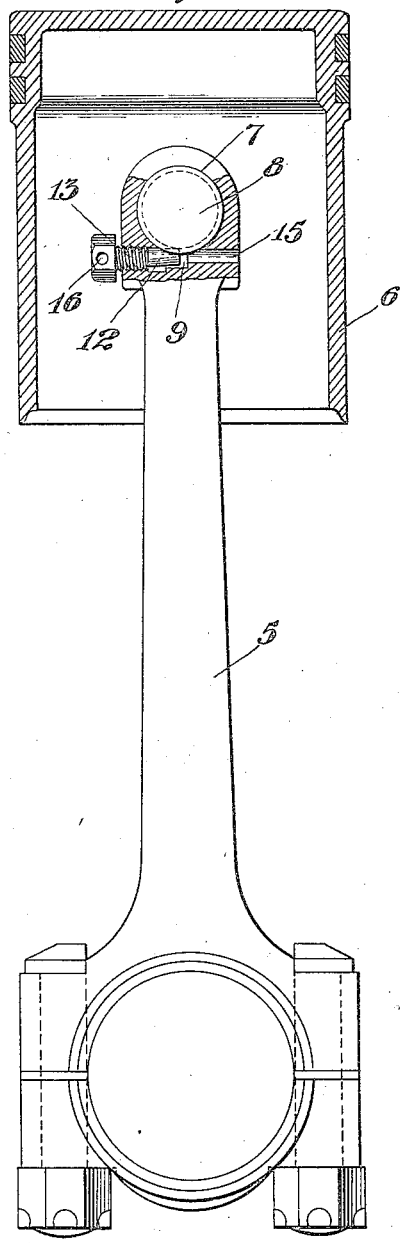
INVENTOR.
Arthur C. Mason
BY
ATTORNEY.

Patented Feb. 6, 1923.

1,444,352

UNITED STATES PATENT OFFICE.

ARTHUR C. MASON, OF DETROIT, MICHIGAN, ASSIGNOR TO GENERAL MOTORS CORPORATION, OF DETROIT, MICHIGAN, A CORPORATION OF DELAWARE.

CONNECTING ROD AND WRIST-PIN CONNECTING DEVICE.

Application filed February 21, 1919. Serial No. 278,483.

*To all whom it may concern:*

Be it known that I, ARTHUR C. MASON, a citizen of the United States, and resident of Detroit, Wayne County, State of Michigan, have invented certain new and useful Improvements in Connecting Rod and Wrist-Pin Connecting Devices, of which the following is a specification.

My invention relates to connecting rod and piston or wrist pin construction; and the object thereof is to provide an improved form of joint or connection between the connecting rod of an internal combustion or other type of engine, a pump, or a similar device and the piston thereof with which the rod is operatively connected through and by means of the connection or joint aforesaid; the said joint being of simple construction and one which may be readily and cheaply made by simple manufacturing operations, and by the use of elements or parts which are for the most part of standard or readily procurable form.

A further object of my invention is to provide a joint or connection for the purpose stated and in which improved means are provided for preventing movement of the wrist pin along its axis, or in the direction of its length, to thereby more effectively prevent the ends of the pin from coming into contact with the interior of the cylinder within which the piston operates and grooving, scoring or otherwise injuring the same.

A further object of my invention is to provide a joint or connection of the class described and in which improved means are present for locking the pin against angular movement within the bearing or seat provided in the connecting rod to receive it, to thereby more certainly cause the pin to oscillate in the bearings provided for its ends in or carried by the piston with which the rod is operatively connected through the pin.

With the above and other objects of invention in view, my invention consists in the improved piston or wrist pin connection illustrated in the accompanying drawing and hereinafter described and particularly claimed, and in such variations and modifications thereof as will be obvious to those skilled in the art to which my invention relates.

In the drawing accompanying and forming a part of this specification, and wherein the preferred embodiment of my invention is illustrated:

Figure 1 is a view showing a connecting rod connected with a piston through and by means of my improved joint or connection, and Figure 2 is a view showing a modified form of invention.

Referring now to the drawing, the reference numeral 5 designates a connecting rod the lower end of which is provided with a bearing through which it may be connected with a crank pin, while the upper end thereof is operatively connected with a piston 6 by means of and through the improved piston pin connection or joint wherein my invention consists.

The upper end of the connecting rod is provided with a piston or wrist pin bearing or seat 7 within which a wrist pin 8 is held, the ends of said wrist pin extending beyond the limits of the bearing or seat 7 at each side of the rod and into oppositely located bearings carried by or formed integrally with the wall of the piston, as is commonly the case in pistons used in internal combustion engines.

Extending transverse to the bearing or seat provided for the wrist pin is a passage 9 the outer end of which is threaded, and which passage may extend part way only, or entirely through the connecting rod. This passage is arranged at one side of the bearing or seat 7 provided for the wrist pin, although it intersects the said passage, as shown, the said transverse passage being in fact tangential, or substantially tangential to the bearing within which the piston or wrist pin is secured.

The wrist pin is provided with a recess at its central portion which registers with the transverse passage 9 when the wrist pin is properly positioned within its bearing, said recess being in the form of a circumferentially extending groove 10 semi-circular in cross-section in the preferred embodiment of my invention illustrated in the drawing.

The wrist pin is locked in place within its bearing or seat and prevented from moving in the direction of its length, and the extremities thereof thus prevented from coming into contact with the interior of the cylinder within which the piston operates and grooving, scoring, or otherwise injuring the same, by means of a combined securing and locking member located within the transverse passage 9 and extending into the recess or groove 10, said member being in the form of a steel ball 11 in the form of my invention illustrated in Figure 2, and in the form of a tapered portion 12 or extension of a cap screw 13 in threaded engagement with the threaded portion of the transverse passage in the form of my invention shown in Figure 1. Obviously the securing and locking member 12 may be formed integrally with the cap screw 13, or may be an element separate and distinct therefrom. A cap or set screw 14 similar to the screw 13 is provided in the form of my invention illustrated in Figure 2, and the purpose and operation of the screws 13 and 14 is to force the securing and locking members 11 and 12 along the transverse passage 9 when the said screws are screwed inwardly, as will be appreciated.

The securing and locking members are preferably located within a portion of the passage 9 which is somewhat smaller than the threaded outer portion thereof, and the said passage is preferably further reduced in diameter and extended clear through the connecting rod, as shown at 15, in order that the ball 11, or the securing element 12 if separate from the screw 13, may be driven out of the passage 9 and through the threaded inlet portion thereof through which it was inserted thereinto by a rod introduced through the extension 15 of the passage in disassembling the parts, as will be appreciated.

The form and relative arrangement of the locking elements 11, 12, the portion of the transverse passage 9 in which they are located, and the recess or groove 10 of the wrist pin are such that relatively inclined surfaces movable one past the other are present, so that as said locking elements are forced along the passage by the screws 13, 14 a wedging action in a direction away from the transverse passage will be produced, a wrist pin being forced bodily in a direction away from the transverse passage 9, and against the portion of its bearing or seat 7 which lies opposite the said passage, as the locking elements or members are forced along the passages within which they are located by the said screws.

The heads of the screws 13, 14 are provided each with a hole, as shown at 16.

As changes of construction could be made within the scope of my invention, it is intended that all matter contained in the above description or shown in the accompanying drawings shall be interpreted as illustrative and not in a limiting sense.

Having thus described and explained my invention, I claim and desire to secure by Letters Patent:—

1. A connecting rod having a wrist pin bearing, and a transversely extending passage arranged substantially tangential to and intersecting the said bearing, and which passage is threaded throughout a part of its length, a wrist pin within the said bearing and having a recess so located as to register with said passage, a locking member located within said passage and extending into said recess, and a screw in threaded engagement with the threaded portion of said passage and whereby said locking element may be forced along said passage.

2. A connecting rod having a wrist pin bearing, and a transversely extending passage arranged substantially tangential to and intersecting the said bearing, and which passage is threaded throughout a part of its length, a wrist pin within the said bearing and having a recess so located as to register with said passage, a locking member located within said passage and extending into said recess, and a screw in threaded engagement with the threaded portion of said passage and whereby said locking element may be forced along said passage, said parts having co-operating relatively inclined surfaces in contact one with another whereby movement of said locking element along said passage will force said wrist pin away from said passage.

3. A connecting rod having a wrist pin bearing, and a transversely extending passage arranged substantially tangential to and intersecting the said bearing, said passage being threaded throughout a part of its length and having a portion of reduced diameter adapted to receive a locking member.

4. A connecting rod having a wrist pin bearing, and a transversely extending passage arranged substantially tangential to and intersecting the said bearing, and which passage is adapted to receive a locking member, said passage being threaded throughout a part of its length, and having a portion of reduced diameter extending entirely through said rod, whereby a rod may be inserted to push the locking member out through the threaded portion of the passage.

5. A connecting rod having a wrist pin bearing, and a transversely extending passage arranged substantially tangential to and intersecting the said bearing, and which passage is threaded throughout part of its length, a wrist pin located within the said bearing and having a circumferentially extending groove so located as to register with said passage, a locking member located within said passage and extending into said groove and adapted to exert a wedging action upon said wrist pin, and a screw in threaded engagement with the threaded portion of said passage and whereby said locking member may be forced along said passage.

In testimony whereof I affix my signature.

ARTHUR C. MASON.